Sept. 24, 1935.   G. M. KRIEGBAUM ET AL   2,015,563
DISCHARGING MECHANISM FOR FERTILIZER DRILLS
Filed June 8, 1933

Inventors
George M. Kriegbaum
David M. Morris
By W. P. Davcock
Atty.

Patented Sept. 24, 1935

2,015,563

UNITED STATES PATENT OFFICE 2,015,563

DISCHARGING MECHANISM FOR FERTILIZER DRILLS

George M. Kriegbaum and David M. Morris, Richmond, Ind., assignors to International Harvester Company, a corporation of New Jersey Application June 8, 1933, Serial No. 674,933

10 Claims. (Cl. 221—130)

The present invention relates to mechanism for discharging granular material from a hopper, and in particular to discharge mechanism for fertilizer drills used in agriculture.

As heretofore constructed, fertilizer hoppers of the axial discharge type are usually provided with discharge openings and feed wheels giving a rate of discharge which is fairly uniform at a certain speed. If this speed is reduced to obtain a lesser rate of discharge, the discharge ceases to be uniform. It is the principal object of this invention to provide means for decreasing the rate of feed while maintaining a uniform rate of discharge, in the nature of a simple accessory for use in combination with the standard feed mechanism of the hopper, which will reduce the effective size of the discharge opening and assist in discharging the material.

The foregoing object is attained by the novel combination of parts and details of structure hereinafter described and claimed and illustrated in the accompanying drawing, where:

Figure 1:
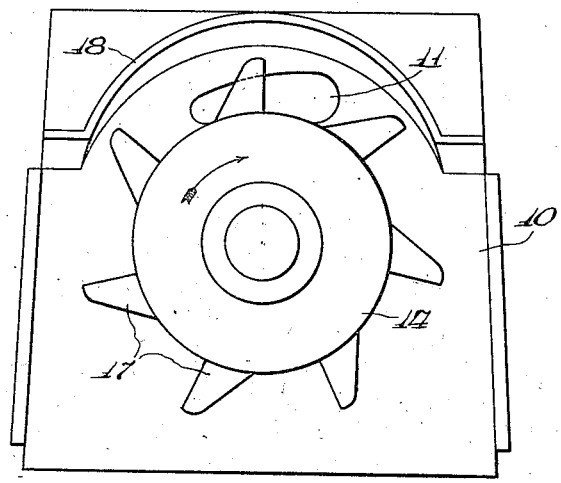
Figure 1 is a plan view of a standard form of hopper bottom and feed mechanism.

The invention is herein illustrated in connection with feed mechanism comprising the bottom plate 10 of a hopper having an oblong feed opening 11 at one side and a central drive shaft opening 12. The opening 12 receives the depending drive element or stub shaft 13 of a feed wheel hub 14, which has a marginal flange 15 resting on the bottom plate of the hopper. The stub shaft 13 is provided at its lower end with pins 16 for interlocking connection with suitable drive mechanism. The feed wheel is formed with a circular hub portion 14, the periphery of which is provided with a plurality of radial arms 17 which are spaced above the bottom plate 10 and adapted to pass over the discharge opening 11 located at the periphery of the hub portion of the feed wheel.

An arcuate wall or baffle 18 is preferably provided on the bottom plate of the hopper adjacent the opening 11 to assist in confining the material at the place of discharge.

Figure 2:
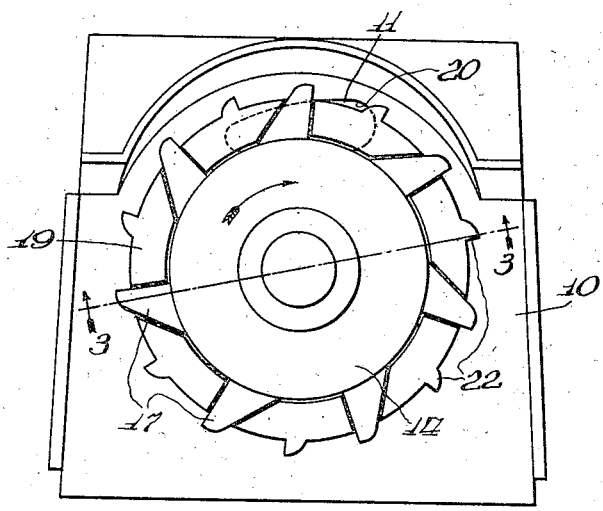
Figure 2 is a similar view, showing the feed mechanism as modified by the present invention.
Figure 4:
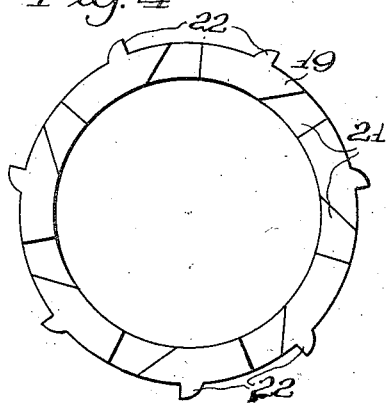
Figure 4 is a plan view of the accessory ring for reducing the feed.
Figure 3:
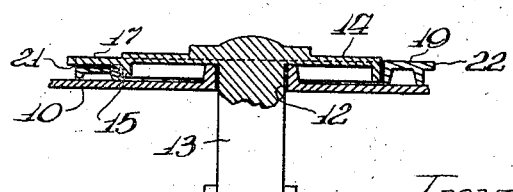
Figure 3 is a vertical section on the line 3—3 of Figure 2.

In the practice of the present invention there is provided an accessory ring 19 designed to encircle or fit around the hub portion of the feed wheel 14, thereby increasing its effective diameter and closing all but a small portion 20 of the feed opening 11. The accessory ring is of less width than the length of the arms 17 on the feed wheel and the outer ends of these arms, therefore, project beyond the ring, as seen in Figure 2. As the arms 17 of the feed wheel are spaced above the bottom plate of the hopper, as seen in Figure 3, the accessory ring 19 is constructed to fit under these arms and is formed with seats 21 conforming to the shape of the intermediate portions of the arms 17 and receiving the same, thereby providing an interlocking fit including shoulders engaged by the arms 17 for driving the ring in conjunction with the feed wheel.

In order to assist agitation and delivery of the fertilizer material to the reduced opening 20, the periphery of the accessory ring is provided with uniformly spaced stub arms or projections 22 located at points between the seats 21 and of the same length as the projecting ends of the arms 17. The ends of the arms 17 and the lugs 22, therefore, provide a series of short arms or projections on the periphery of the combined feed wheel and ring which sweep over the reduced opening 20.

In applying the reducing ring to the feed wheel, it is only necessary to lift the feed wheel 14 from its driving connection and place the reducing ring in position under it, and then return the wheel and ring to position in the bottom of the hopper. The mechanism will then operate as before, as the ring will be driven through its interlocking connection with the arms of the feed wheel, but the quantity of fertilizer discharged will be reduced in accordance with the width of the accessory ring used.

What is claimed is:

1. In a hopper discharging mechanism, the combination with a fertilizer feed wheel having a circular hub with sweep arms radiating therefrom and adapted to pass over the discharge opening of a hopper, of a removable feed reducing ring surrounding the hub and formed with shoulders engaged by the arms, said ring being of less width than the length of the arms so that the ends of the arms project beyond the rim.

2. In a hopper discharging mechanism, the combination with a fertilizer feed wheel having a circular hub with sweep arms radiating therefrom and adapted to pass over the discharge opening of a hopper, of a removable feed reducing ring surrounding the hub and formed with shoulders engaged by the arms, said ring being of less width than the length of the arms so that the ends of the arms project beyond the rim, and radial projections on the periphery of the ring at points midway between the projecting ends of the arms.

3. In a hopper discharging mechanism, the combination with a fertilizer feed wheel having a circular hub with sweep arms radiating therefrom and adapted to pass over the discharge opening of a hopper, of a removable feed reducing ring surrounding the hub and formed with shoulders engaged by the arms, said ring being of less width than the length of the arms so that the ends of the arms project beyond the rim, and radial projections on the periphery of the ring at points midway between the projecting ends of the arms, said projecting ends and the radial projections on the ring being of equal length.

4. In a hopper discharging mechanism, the combination with a fertilizer feed wheel rotatably mounted on a hopper bottom, said wheel having a circular hub with sweep arms radiating therefrom and adapted to pass over a discharge opening in the hopper bottom located adjacent the periphery of the hub of the feed wheel, of a removable feed reducing ring surrounding the hub and forming a radial extension thereof partly covering the opening in the hopper bottom, said ring being formed with depressed portions receiving the intermediate portions of the arms of the feed wheel.

5. In a hopper discharging mechanism, the combination with a hopper having a discharge opening and a feed wheel rotatably mounted on the hopper bottom, said wheel having a circular hub with sweep arms radiating therefrom and adapted to pass over a discharge opening in the hopper bottom located adjacent the periphery of the hub of the feed wheel, of a removable feed reducing ring surrounding the hub and forming a radial extension thereof partly covering the opening in the hopper bottom, said ring being formed with depressed portions receiving the intermediate portions of the arms of the feed wheel, and radial projections on the periphery of the ring at uniformly spaced points located between said depressions.

6. In a hopper discharging mechanism, the combination with a hopper having a discharge opening and a feed wheel rotatably mounted in the hopper and having a circular hub with peripheral projections moving over said discharge opening, of a removable feed reducing ring fitting around the hub and interlocking with the peripheral projections of said feed wheel for rotation therewith, said ring covering a portion of the discharge opening.

7. In a hopper discharge mechanism, the combination with a hopper having a discharge opening and a feed wheel rotatably mounted in the hopper and having peripheral projections moving over said discharge opening, of a removable feed reducing ring fitting around said feed wheel and interlocking with the peripheral projections of said feed wheel for rotation therewith, said ring covering a portion of the discharge opening.

8. In a hopper discharge mechanism, the combination with a hopper having a discharge opening and a feed wheel rotatably mounted in the hopper and having peripheral projections moving over said discharge opening, of a removable feed reducing ring fitting around the feed wheel and interlocking with the peripheral projections of said feed wheel for rotation therewith, said ring covering a portion of the discharge opening, and means projecting from the periphery of said feed reducing ring for assisting agitation and delivery to said discharge opening.

9. A feed reducing attachment for a hopper discharge mechanism having a discharge opening and a feed wheel rotatably and removably mounted therein and provided with radial feed arms, comprising an annular ring for surrounding said feed wheel and covering a portion of said discharge opening, and means on said ring for interlocking with the feed arms of said feed wheel for rotating said feed reducing attachment uniformly with said feed wheel.

10. A feed reducing attachment for a hopper discharge mechanism having a discharge opening and a feed wheel with projections thereon rotatably and removably mounted therein, comprising an annular ring for surrounding said feed wheel and covering a portion of said discharge opening, means on said ring for interlocking with the projections of said feed wheel for rotating said feed reducing attachment uniformly with said feed wheel, and means on the periphery of said ring for assisting agitation and delivery to said discharge opening.

GEORGE M. KRIEGBAUM.
DAVID M. MORRIS.